Jan. 30, 1962 R. B. MADDOCK 3,018,935
FILM STRAND ROLLERS FOR FILM PROCESSING MACHINE
Filed Nov. 4, 1960 2 Sheets-Sheet 1
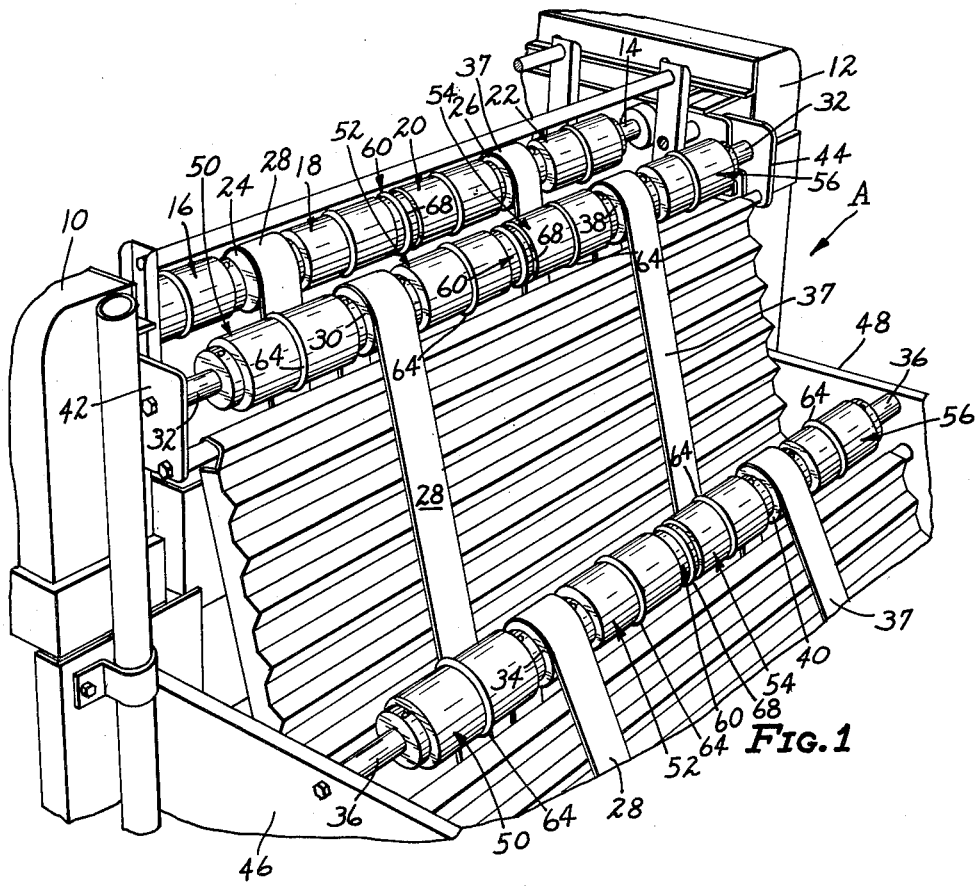
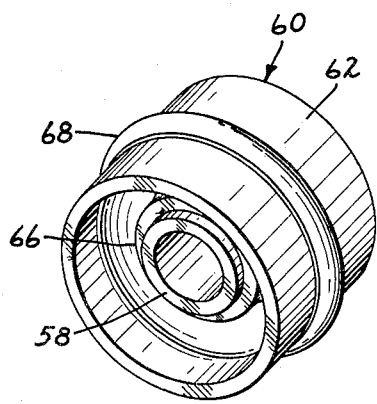
INVENTOR.
RALPH B. MADDOCK
BY
Caswell, Lagaard & Wicks
ATTORNEYS

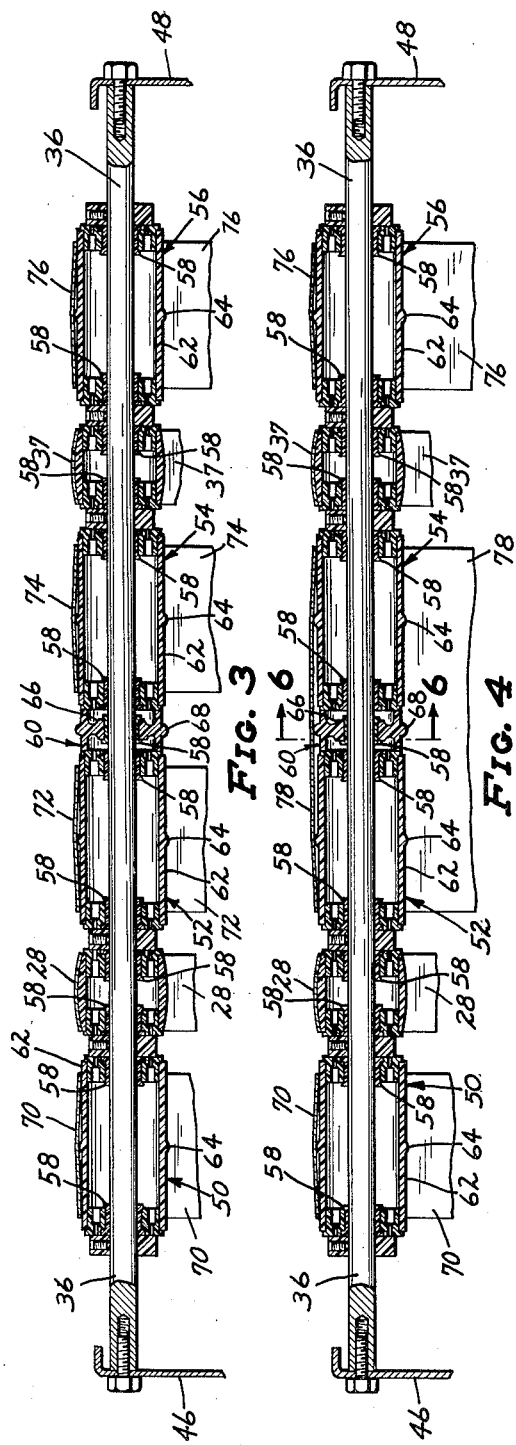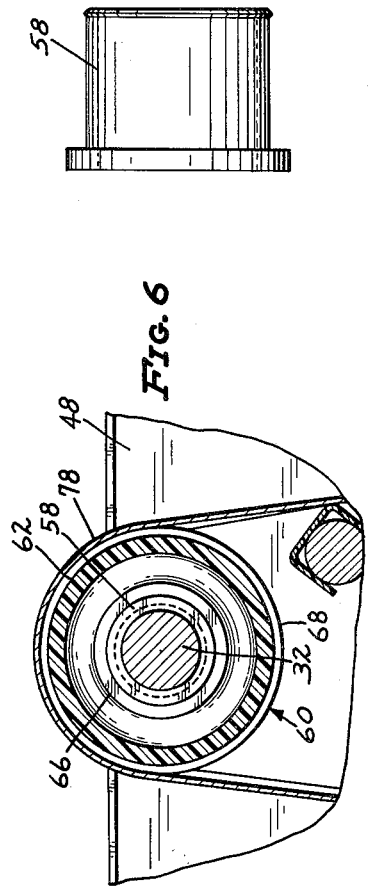

United States Patent Office 3,018,935
Patented Jan. 30, 1962

---

3,018,935
FILM STRAND ROLLERS FOR FILM
PROCESSING MACHINE
Ralph B. Maddock, Minneapolis, Minn., assignor to Pako Corporation, Minneapolis, Minn.
Filed Nov. 4, 1960, Ser. No. 67,324
4 Claims. (Cl. 226—190)

The invention relates broadly to an improvement in a machine for processing any photographic sensitized material whether it be paper or film, more particularly to means for transporting the film or paper through the machine and specifically to means for transporting and guiding film or paper of different widths through the processing machine.

The machine concerned is a more or less complete processer which, in the case of black and white pictures, develops, stops, fixes and washes. In the case of color, the machine color develops, stops and hardens, washes, bleaches, washes and buffs and dries. At least one such machine transports paper or film through a series of tanks having photographic processing solutions in a continuous length or strand. A length or strand of paper may be attached to and extending from each side of an endless leader belt mounted on drive rollers, each length of paper riding on and guided by a strand roller on each side of the belt. Thus, one leader belt serves two strand rollers. The width of each strand of film or paper is limited to the width of the roller.

It is an object of this invention to provide a processing machine having roller means for transporting strands of film or paper of different widths not limited by the width of a roller, as is true with present-day machines.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of a portion of a processing machine.

FIGURE 2 is a perspective view of a central roller member forming part of the invention.

FIGURE 3 is a longitudinal sectional view through a roller shaft having a series of strand rollers thereon with a strand of paper shown on each roller in section.

FIGURE 4 is a sectional view similar to FIGURE 3 with a wide strand carried by the strand rollers and the central roller.

FIGURE 5 is a longitudinal side view of a bearing member used to mount the rollers.

FIGURE 6 is a sectional view on the line 6—6 of FIGURE 4.

Referring to the drawings in detail, the film processing machine A includes the generally upright support members 10 and 12, support 12 containing drive means for rotating the shaft 14 rotatably supported by said supports 10 and 12. Mounted on the shaft 14 are the strand rollers 16, 18, 20 and 22. Also mounted on the shaft 14 is the belt drive roller 24 which is positioned between rollers 16 and 18 and driven by means of a conventional tendency drive connection with the shaft. Also provided is the belt drive roller 26 positioned on the shaft 14 between the rollers 20 and 22, and the roller 26 is also driven by means of a conventional tendency drive connection with the shaft 14.

The machine A consists of a series of tanks and at the top of each tank is a shaft such as 14. An endless leader belt 28 is mounted over the drive roller 24 and also over a roller upon a shaft at the bottom of the tank (not shown) and thence over the belt roller 30 mounted on the free shaft 32 downwardly to a further lower roller (not shown) and upwardly over the belt roller 34, mounted on the free shaft 36. A similar leader belt 37 is similarly mounted on the drive rollers 26, 38 and 40 of the shafts 14, 32 and 36, respectively. The shaft 32 is connected at one end to the support plate 42 connected to support 10 and at the other end to the support plate 44, connected to the support 12. The shaft 36 is supported at its outer ends to the side wall members 46 and 48.

The shaft 32 has mounted thereon the end strand roller 50, the strand rollers 52 and 54 between the belt drive rollers 30 and 38 and also the end strand roller 56. Similar strand rollers are mounted on the shaft 36 in conjunction with the belt rollers 34 and 40. All of the strand rollers and the belt rollers 30, 34, 38 and 40 are mounted on the "nylon" bearings 58. Each of the strand rollers is formed of the outer cylindrical casing portion 62, and on the outer surface of the casing is centrally disposed annular crown rib 64. The crown rib 64 influences the strand of paper upon the roller whereby the strand is guided straight, that is at right angles to the longitudinal axis of the roller.

Further provided is the central roller 60, which is positioned on the shaft 14 between the strand rollers 18 and 20. An identical central roller 60 is positioned between the strand rollers 52 and 54 on the shaft 32, and a central roller 60 is similarly positioned on the shaft 36.

The central roller 60 is made up of the outer cylindrical body portion 62, formed integrally with the hub portion 66 in which is mounted the bearing member 58, which in turn is mounted on the shaft 14, 32 and 36. On the outer surface of the cylindrical body portion 62 of the roller 60 is formed the medial annular crown rib 68. The major diameter of the rib 68 is slightly greater than the major diameter of the rib 64 of the strand rollers.

It will be seen that without the central roller 60, the width of a strand of paper or film 70 that can be transported through the machine A is limited to substantially the width of the casing portion 62 of the strand roller such as 50, particularly demonstrated in FIGURE 3. This is true with any of the strand rollers illustrated.

With the central roller 60, the operator may transport four strands such as 70, 72, 74 and 76 on the strand rollers 50, 52, 54 and 56, respectively, FIGURE 3, and in the alternative a much wider strand such as 78, FIGURE 4, may be transported through the machine A for processing along with sheets 70 and 76, FIGURE 4. With the central roller 60 in combination with the strand rollers 52 and 54, FIGURE 4, it will be seen that the strand 78 rides on the crown rib 68 of the roller 60, which influences the strand 78 and guides it straight through the machine at a right angle to the longitudinal axis of the shaft 36. The strand 78 is, of course, also supported by the strand rollers 52 and 54. Thus, with the two strand rollers 52 and 54, the operator may process two narrow strands of sheet material 72 and 74, or one strand of wider material such as 78, the maximum width of strand material 78 being up to substantially the sum of the width of the two narrower strand rollers 52 and 54 plus the width of the central roller 60.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a film processing machine for strand material having a series of tanks having film-transporting rollers operatively connected thereto, an improvement in the rollers, said improvement including in combination, a shaft, a pair of strand rollers each having an annular crown rib and mounted on said shaft, a central strand roller positioned on said shaft between said strand rollers, said central roller having an annular crown rib formed thereon and having a major diameter greater than the major diameter of said crown ribs of said strand rollers for centering and transporting a single strand having a width up to the combined width of said pair of strand rollers and said central roller.

2. In a multiple roller for transporting film strands of various widths in a film processing machine, a shaft, a pair of strand rollers each having an annular crown rib and mounted on said shaft, each of said pair of rollers adapted to center and transport a film strand, a central strand roller positioned on said shaft between said strand rollers, said central roller having an annular crown rib formed thereon and having a major diameter greater than the major diameter of said crown ribs of said strand rollers to center and transport a single strand having a width up to the combined width of said pair of strand rollers and said central roller.

3. In a multiple roller for transporting film strands of various widths in a film processing machine, a shaft, a pair of strand rollers each having an annular raised portion medially thereof and mounted on said shaft, each of said pair of rollers adapted to center and transport a film strand, a central strand roller positioned on said shaft between said strand rollers, said central roller having an annular raised portion medially thereof and having a major diameter greater than the major diameter of said annular raised portion of said strand rollers to center and transport a single strand having a width up to the combined width of said pair of strand rollers and said central roller.

4. In a multiple roller for transporting a film strand in a film processing machine, a shaft, a pair of strand rollers mounted on said shaft, and a central strand roller positioned on said shaft between said strand rollers having a diameter greater than the major diameter of said strand rollers to center and transport a single strand having a width up to the combined width of said pair of strand rollers and said central roller.

References Cited in the file of this patent

UNITED STATES PATENTS

| | | |
|---|---|---|
| 2,210,880 | Capstaff | Aug. 13, 1940 |
| 2,590,699 | Heyer | Mar. 25, 1952 |
| 2,653,814 | Lorig | Sept. 29, 1953 |